United States Patent
Duluard

(10) Patent No.: US 9,057,140 B2
(45) Date of Patent: Jun. 16, 2015

(54) METHOD OF MANUFACTURING AN ELECTROCHROMIC ARTICLE

(75) Inventor: Sandrine Duluard, Paris (FR)

(73) Assignee: ESSILOR INTERNATIONAL (COMPAGNIE GENERALE D'OPTIQUE), Charenton le Pont (FR)

(*) Notice: Subject to any disclaimer, the term of this patent is extended or adjusted under 35 U.S.C. 154(b) by 390 days.

(21) Appl. No.: 13/699,863

(22) PCT Filed: May 19, 2011

(86) PCT No.: PCT/FR2011/051135
§ 371 (c)(1),
(2), (4) Date: Nov. 26, 2012

(87) PCT Pub. No.: WO2011/148081
PCT Pub. Date: Dec. 1, 2011

(65) Prior Publication Data
US 2013/0062213 A1    Mar. 14, 2013

(30) Foreign Application Priority Data
May 27, 2010 (FR) ...................................... 10 54070

(51) Int. Cl.
*C25D 5/02* (2006.01)
*G02F 1/15* (2006.01)

(52) U.S. Cl.
CPC ... *C25D 5/02* (2013.01); *G02F 1/15* (2013.01)

(58) Field of Classification Search
CPC ....................................................... C25D 5/02
See application file for complete search history.

(56) References Cited

U.S. PATENT DOCUMENTS

| 4,938,571 A * | 7/1990 | Cogan et al. ................... 359/275 |
| 2011/0070361 A1 * | 3/2011 | Duluard et al. ................. 427/64 |

FOREIGN PATENT DOCUMENTS

| WO | WO 2009/156692 | 12/2009 |
| WO | WO2009156692 | * 12/2009 |

OTHER PUBLICATIONS

PCT International Search Report and Written Opinion received in PCT/FR2011/051135.
Ho K-C, "Cycling and at-rest stabilities of a complementary electrochromic device based on tungsten oxide and Prussian blue this films", *Electrochimica ACTA*, Elsevier Science Publishers, Banking, GB, vol. 44, No. 18, pp. 3227-3235 (May 1, 1999), XP004167166.

* cited by examiner

*Primary Examiner* — Nathan T Leong
(74) *Attorney, Agent, or Firm* — Vedder Price P.C.; Thomas J. Kowalski; Deborah L. Lu

(57) ABSTRACT

The present invention relates to a process for manufacturing an electrochromic article comprising the following successive steps: (a) the deposition of a layer of an electrochromic compound on the surface of a transparent or translucent electrically conductive substrate, said layer of electrochromic compound covering only one portion of the surface of said electrically conductive substrate and leaving free at least one other portion thereof, (b) the deposition of a redox agent which is a reducing agent or an oxidizing agent for the electrochromic compound, on the portion of the surface of the electrically conductive substrate not covered by the layer of electrochromic compound, (c) the contacting of the layer of electrochromic compound, deposited in step (a), and of the layer of redox agent, deposited in step (b), with a liquid electrolyte for a sufficient time to enable the reduction or the oxidation of the electrochromic compound by the redox agent, and (d) the removal of the electrolyte by rinsing and/or drying.

12 Claims, No Drawings

METHOD OF MANUFACTURING AN ELECTROCHROMIC ARTICLE

RELATED APPLICATIONS

The present application is filed pursuant to 35 U.S.C. §371 as a U.S. National Phase application of International Patent Application No. PCT/FR2011/051135, which was filed on May 19, 2011, claiming the benefit of priority to French Patent Application No. FR 10 54070 filed on May 27, 2010. The entire content of each of the aforementioned applications is incorporated herein by reference in its entirety.

The present invention relates to a process for manufacturing an electrochromic article, comprising a step of non-electrolytic reduction or oxidation of an electrochromic coating.

The studies that have led to the present application received funding from the Seventh Framework Program of the European Commission under the grant agreement No. INNOSHADE-200431-NMP LARGE.

Electrochromic glazing units typically have a structure comprising two transparent outer layers, for example two sheets of organic or mineral glass, two electrically conductive layers deposited on the inner faces of the outer layers and connected to a power supply, and an electrolyte placed between the two electrically conductive layers, at the center of said device.

An electrochromic layer being provided between the electrolyte and at least one of the electrically conductive layers, preferably between the electrolyte and the two electrically conductive layers. The electrochromic dyes of the two electrochromic layers are then chosen so that one of them is colored in the reduced state and colorless or weakly colored in the oxidized state, whereas the other is colored in the oxidized state and colorless or weakly colored in the reduced state.

In such an electrochromic device containing two electrochromic substances, one of the two will be in the oxidized state when the other is in the reduced state and vice versa. It is therefore necessary that before assembling the various elements, one of the two electrochromic layers is in reduced form and the other in oxidized form.

The deposition of a thin layer of at least one electrochromic compound on an electrically conductive substrate is carried out for example by electrodeposition or by a non-electrolytic route according to known techniques.

However, most of the electrochromic coatings deposited thus in the form of a thin layer are in the oxidized state and must consequently undergo a reduction before integration into an electrochromic device as described above.

Such a reduction is typically carried out:
either by immersion in a solution of a reducing agent, which suffers however from a very low storage stability and requires an additional step of rinsing of the film in order to remove the residual reducing agent,
or in an electrochemical cell: the electrically conductive layer bearing the coating of electrochromic compound to be reduced is connected to a first electrode (working electrode) and the assembly is immersed in a bath of electrolyte in which a counterelectrode is also submerged, generally a sacrificial counterelectrode containing a reducing agent for the electrochromic compound and optionally a reference electrode.

Such an electrochemical system having two or three electrodes is relatively complex and requires an adaptation of the geometry of the various components, in particular of the dimensions of the bath, to the size of the part to be treated. It is often inappropriate when the size of the surfaces to be reduced becomes very large, as is the case for example for electrochromic windows, or when these surfaces are curved. It is not particularly suitable either for continuous reduction processes.

Furthermore, with such an electrochemical system, it is difficult to obtain, beyond a certain size of the coating to be reduced, a homogeneous reduction over the whole of the surface.

The objective of the present invention has been to propose a process for reducing coatings of electrochromic compounds, deposited on electrically conductive substrates (referred to hereinbelow equally as conductive substrates, electrically conductive layers or conductive layers), which would make it possible both to do away with the problems of adapting the sizes of the electrochemical apparatus to the size of the object to be reduced and to enable electrochromic coatings to be obtained that are reduced homogeneously over large areas. This process must advantageously be able to be carried out in continuous mode, for example over long strips bearing electrochromic coatings.

The process developed by the applicant makes it possible to solve, with simple and inexpensive means, all of these problems. Although the process proposed is particularly useful for reducing electrochromic compounds deposited in the oxidized state, it will readily be understood on reading the description below that it can be adapted very easily to the oxidation of coatings which are in the reduced state and the invention consequently covers these two cases, the reduction of a coating of electrochromic compound in the oxidized state being simply a preferred embodiment of the process of the invention.

The operating principle of the process of the present invention essentially consists in replacing the two electrodes of the device for electrolytic reduction with a sufficient quantity of a redox agent (reducing agent or oxidizing agent) deposited on a region of the electrically conductive substrate not covered by the coating of the electrochromic compound to be reduced or to be oxidized. When the assembly formed by the coating of electrochromic compound, the electrically conductive substrate and the redox agent is then brought into contact with a liquid electrolyte, an indirect redox reaction takes place, via the subjacent conductive layer, between the redox agent and the electrochromic compound that are deposited thereon. The electrochromic compound, in contact with the surface of the conductive substrate, is reduced or oxidized and forms the final electrochromic compound.

The subject of the present invention is consequently a process for manufacturing an electrochromic article comprising the following successive steps:
(a) the deposition of a layer of an electrochromic compound on the surface of a transparent or translucent electrically conductive substrate, said layer of electrochromic compound covering only one portion of the surface of said electrically conductive substrate and leaving free at least one other portion thereof,
(b) the deposition of a redox agent which is a reducing agent or an oxidizing agent for the electrochromic compound, on the portion of the surface of the electrically conductive substrate not covered by the layer of electrochromic compound,
(c) the contacting of the layer of electrochromic compound, deposited in step (a), and of the layer of redox agent, deposited in step (b), with a liquid electrolyte for a sufficient time to enable the reduction or the oxidation of the electrochromic compound by the redox agent, and
(d) the removal of the electrolyte by rinsing and/or drying.

The compound deposited in step (a) may in principle be any electrochromic compound. Among the known electrochromic compounds, those for which one of the two coloration states is a essentially colorless state are particularly preferred.

Mention may be made, as examples of such electrochromic compounds, of hexacyanometallates such as the hexacyanoferrates of iron, vanadium, ruthenium, cadmium, chromium, palladium or platinum, $WO_3$, $V_2O_5$ and NiO. Use may also be made of electrochromic polymers such as poly(3,4-ethylenedioxythiophene) (PEDOT) which is essentially transparent and colorless in the oxidized state and is of blue color in the reduced state. Finally, although viologens such as alkylviologens, arylviologens or alkylarylviologens are not particularly suitable as such, the polymers thereof, polyviologens, form good quality electrochomic layers.

The list of electrochromic dyes above does not however have any limiting character and the process of the present invention will be able to be adapted in principle to any electrochromic compound not appearing in this list, on the condition that it has sufficient adhesion to the subjacent conductive substrate, that it is insoluble in the liquid electrolyte and that a suitable redox agent is used.

In step (a) of the process according to the invention, the electrochromic compound is deposited in the form of a thin coating on the surface of a transparent electrically conductive substrate. This deposition will be able to be carried out according to known techniques such as electrodeposition, sol-gel deposition, chemical vapor deposition (CVD), physical vapor deposition (PVD), inkjet printing, or the non-electrolytic deposition as described in WO 2009/156692.

The thickness of the electrochromic coating does not generally exceed a thickness of 10 micrometers and is preferably between 100 and 1000 nm.

In the art, a certain number of organic or mineral transparent conductive materials are known. The mineral materials most widely used are transparent conductive oxides known under the abbreviation TCO, among which mention may be made of the derivatives of tin oxide, of indium oxide or of zinc oxide. Mention may in particular be made of fluorine-doped tin oxide (FTO, fluorine tin oxide), tin-doped indium oxide (ITO, indium tin oxide), antimony-doped tin oxide and aluminum-doped zinc oxide. Tin-doped indium oxide (ITO) is particularly preferred.

Use may also be made of electrically conductive organic polymers such as polyacetylenes, polypyrrols, polythiophenes, polyanilines, poly(p-phenylene sulfide), poly(p-phenylene vinylene). A well-known transparent electrically conductive polymer is poly(3,4-ethylenedioxythiophene) (PEDOT).

The electrically conductive substrate is generally a transparent or translucent electrically conductive layer formed on a non-conductive support. This layer then preferably has a thickness between 50 nm and 10 000 nm, in particular between 100 and 600 nm.

The non-conductive support is of course also preferably transparent or translucent.

It may be a substrate made of mineral glass or else a transparent organic material, for example made of polyethylene terephthalate, polycarbonate, polyamide, polyimide, polysulfones, polymethyl methacrylate, copolymers of ethylene terephthalate and of carbonate, polyolefins, in particular polynorbornenes, homopolymers and copolymers of diethylene glycol bis(allyl carbonate), (meth)acrylic homopolymers and copolymers, in particular the (meth) acrylic homopolymers and copolymers derived from bisphenol-A, thio(meth)acrylic homopolymers and copolymers, homopolymers and copolymers of urethane and of thiourethane, epoxide homopolymers and copolymers and episulfide homopolymers and copolymers.

The non-conductive support may in particular be a relatively flexible material, for example a plasticized or unplasticized polymer, preferably having a glass transition temperature above 60° C., enabling the deposition of the electrochromic compound by rotary printing and the continuous reduction or oxidation of the electrochromic material according to the process of the present invention.

The electrochromic compound is deposited on one portion of the surface of the electrically conductive support only. It is in effect essential to leave free one portion of the electrically conducive layer in order to be able to deposit thereon the redox agent intended to reduce or oxidize the electrochromic dye.

The deposition of the layer of electrochromic dye may of course be carried out before or after deposition of the redox agent. In other words, the order of steps (a) and (b) of the process according to the invention can be reversed and step (b) can precede step (a).

As indicated in the introduction, the redox agent is preferably a reducing agent. The nature of the reducing agent is not a determining factor for the present invention on the condition that this reducing agent is sufficiently insoluble in the liquid electrolyte so as not to be removed from the surface of the electrically conductive substrate before having fulfilled its role that consists in reducing the electrochromic dye. Mention may be made, by way of example of reducing agents that can be used, of nickel (Ni), molybdenum (Mo), copper (Cu), cobalt (Co), indium (In), iron (Fe), zinc (Zn), silicon (Si), silver (Ag), titanium (Ti), aluminum (Al), all these metals preferably being in the metallic state. Use will preferably be made of Cu, Ni, Ag, Ti and Al.

The redox agent is preferably deposited in the vicinity of the edges of the layer of electrochromic compound, or even in contact with these edges.

This deposition may take the form of one or more continuous regions or else a multitude of discrete points.

The size of the region of the surface of the electrically conductive layer covered by the redox agent is relatively small relative to that of the surface of the electrochromic coating. It preferably represents less than 20%, in particular less than 10% and particularly preferably less than 5% of the surface of the electrochromic coating.

The amount of redox agent to be deposited depends of course on the size but also on the thickness of the electrochromic coating that is to be reduced. The reducing agent in effect functions as a "reservoir" of electrons that are available, via the electrically conductive substrate, for the reduction of the electrochromic dye. A person skilled in the art will know how to determine, without any problem, the amount needed in order to obtain the desired reduction of the electrochromic coating.

After accomplishing steps (a) and (b), the substrate bearing, on the one hand, the electrochromic coating and, on the other hand, the redox agent is brought into contact with the liquid electrolyte, preferably by immersion or by spraying with the liquid electrolyte.

The liquid electrolyte may be an aqueous or non-aqueous solution generally, but not systematically, containing a salt. The non-aqueous solvents used may be organic solvents such as propylene carbonate, ethylene carbonate or dimethyl sulfoxide or else ionic liquids. As salts that can be used mention may be made, for example, of lithium perchlorate, tetrabutylammonium perchlorate and potassium chloride.

The bringing into contact with the liquid electrolyte may take place at ambient temperature, that is to say at a temperature between 15 and 25° C., or else at higher temperatures which will only be limited in principle by the thermal degradation of the system.

The contacting time depends on a certain number of factors such as the temperature of the electrolyte, the thickness of the electrochromic layer, the conductivity of the conductive layer, the size of the surface to be reduced and also the rate of the redox reaction. The applicant has observed that for electrochromic layer thicknesses such as indicated above, a contacting time between 30 seconds and 15 minutes, preferably between 1 minute and 8 minutes, is generally sufficient.

EXAMPLE

Deposited by electrodeposition on a transparent support made of polyethylene terephthalate comprising a coating made of tin-doped indium oxide (ITO) having a thickness of 250 nm, is a thin layer of poly(3,4-ethylenedioxythiophene) (PEDOT). This thin layer has the shape of a square (area of around 4 cm$^2$). Applied along each side of this square, in the immediate vicinity, is a copper-plated plastic tape (3M 1245). The assembly is immersed in a solution of tetrabutylammonium perchlorate (TBAClO$_4$) in propylene polycarbonate (1M). The deposit of PEDOT gradually adopts the blue coloration whereas the oxidation of the copper results in the black coloration and the dissolution of the reducing agent. At the end of around one minute, the coloration of the electrochromic deposit no longer intensifies. The electrochromic article is withdrawn from the liquid electrolyte, rinsed and dried.

The invention claimed is:

1. A process for manufacturing an electrochromic article comprising the following successive steps:
    (a) the deposition of a layer of an electrochromic compound on the surface of a transparent or translucent electrically conductive substrate, said layer of electrochromic compound covering only one portion of the surface of said electrically conductive substrate and leaving free at least one other portion thereof,
    (b) the deposition of a layer comprising a redox agent which is a reducing agent or an oxidizing agent for the electrochromic compound, on the portion of the surface of the electrically conductive substrate not covered by the layer of electrochromic compound,
    (c) the contacting of the layer of electrochromic compound, deposited in step (a), and of the layer of redox agent, deposited in step (b), with a liquid electrolyte for a sufficient time to enable the reduction or the oxidation of the electrochromic compound by the redox agent, and
    (d) the removal of the electrolyte by rinsing and/or drying.

2. The process as claimed in claim 1, wherein the redox agent is a reducing agent for the electrochromic compound.

3. The process as claimed in claim 1, wherein the electrically conductive substrate consists of tin-doped indium oxide (ITO), tin-doped fluorine oxide (FTO) or conductive organic polymers.

4. The process as claimed in claim 1, wherein the reducing agent is chosen from the group formed by Ni, Mo, Cu, Co, In, Fe, Zn, Si, Ag, Ti, Al, all these metals being in the metallic state.

5. The process as claimed in claim 4, wherein the reducing agent is chosen from the group formed by Cu, Ni, Ag, Ti and Al.

6. The process as claimed in claim 1, wherein the electrochromic compound is chosen from hexacyanometallates, WO$_3$, V$_2$O$_5$, NiO, and electrochromic polymers.

7. The process as claimed in claim 1, wherein the redox agent is deposited so as to be in contact with the edges of the layer of electrochromic compound or in the vicinity of these edges.

8. The process as claimed in claim 1, wherein the redox agent is deposited in one or more continuous regions or in a multitude of discrete points.

9. The process as claimed in claim 1, wherein the contacting in step (c) is carried out by immersion in the liquid electrolyte or by spraying of the liquid electrolyte.

10. The process as claimed in claim 1, wherein the contacting time, in step (c), is between 30 seconds and 15 minutes.

11. The process as claimed in claim 10, wherein the contacting time, in step (c), is between 1 minute and 8 minutes.

12. A process for manufacturing an electrochromic article comprising the following successive steps:
    (a) the deposition of a layer comprising a redox agent, which is a reducing agent or an oxidizing agent for an electrochromic compound, on the surface of a transparent or translucent electrically conductive substrate, said redox agent covering only one portion of the substrate of said electrically conductive substrate and leaving free at least one other portion thereof;
    (b) the deposition of a layer of the electrochromic compound on the portion of the surface of the electrically conductive substrate not covered by the redox agent;
    (c) the contacting of the layer of redox agent, deposited in step (a), and the layer of electrochromic compound, deposited in step (b), with a liquid electrolyte for a sufficient time to enable the reduction or the oxidation of the electrochromic compound by the redox agent; and
    (d) the removal of the electrolyte by rinsing and/or drying.

* * * * *